(12) United States Patent
Youn et al.

(10) Patent No.: US 8,303,743 B2
(45) Date of Patent: Nov. 6, 2012

(54) THERMOPLASTIC COMPOUND PLATE-SHAPED MATERIAL, METHOD FOR MANUFACTURING AND ARTICLES MANUFACTURED USING THE SAME

(75) Inventors: Sang Jun Youn, Chungcheongnam-Do (KR); Ho Gab Jeong, Chungcheongnam-Do (KR)

(73) Assignee: Boditechmed Inc., Gangwon-Do (KR)

( * ) Notice: Subject to any disclaimer, the term of this patent is extended or adjusted under 35 U.S.C. 154(b) by 0 days.

(21) Appl. No.: 13/049,700

(22) Filed: Mar. 16, 2011

(65) Prior Publication Data

US 2011/0162777 A1 Jul. 7, 2011

Related U.S. Application Data

(62) Division of application No. 10/599,523, filed as application No. PCT/KR2005/001250 on Apr. 29, 2005.

(30) Foreign Application Priority Data

Apr. 30, 2004 (KR) .................. 10-2004-0030641

(51) Int. Cl.
*D04H 3/10* (2012.01)

(52) U.S. Cl. ......... 156/181; 156/212; 156/163; 156/229

(58) Field of Classification Search .................. 156/188, 156/212, 196, 229, 166, 178, 176, 180, 181
See application file for complete search history.

(56) References Cited

U.S. PATENT DOCUMENTS

| 5,279,893 A | 1/1994 | Hattori et al. |
| 5,294,394 A | 3/1994 | Sakai et al. |
| 6,749,934 B2 | 6/2004 | Nagayama et al. |
| 2002/0009935 A1 | 1/2002 | Hsiao et al. |
| 2003/0161989 A1 | 8/2003 | Funakoshi |

FOREIGN PATENT DOCUMENTS

| EP | 945253 A2 | 9/1999 |
| FR | 2832954 A1 | 6/2003 |
| JP | 1228141 A | 9/1989 |
| JP | 3205115 A | 9/1991 |
| KR | 1020010016955 A | 3/2001 |
| KR | 1020020092590 A | 12/2002 |
| KR | 1020040003835 A | 1/2004 |
| WO | 0048830 A1 | 8/2000 |
| WO | 0058083 A1 | 10/2000 |

OTHER PUBLICATIONS

International Search Report, PCT/KR2005/001250, Jul. 27, 2005, 3 pages.
International Preliminary Report on Patentability, PCT/KR2005/001250, Jul. 18, 2006, 3 pages.

(Continued)

*Primary Examiner* — Khanh P Nguyen
*Assistant Examiner* — Vishal I Patel
(74) *Attorney, Agent, or Firm* — Conley Rose, P.C.; J. Robert Brown, Jr.

(57) ABSTRACT

The present invention relates to a method of manufacturing a thermoplastic composite sheet, comprising the steps of impregnating fibers with a thermoplastic resin melt, drawing and pressing the impregnated fibers in a tape or strand shape, preparing a prepreg layer by aligning the drawn and pressed fibers to form wefts and wraps, providing the prepreg layer on at least one surface of a center layer, and compressing the layers.

16 Claims, 8 Drawing Sheets

OTHER PUBLICATIONS

First Examination Report Dated Nov. 5, 2009, 5 pages, Government of India Patent Office, Application No. 5453/DELNP/2006, filed on Sep. 20, 2006.
Office Action dated Mar. 20, 2009, 6 pages, U.S. Appl. No. 10/599,523, filed Sep. 29, 2006.
Office Action dated Jun. 19, 2009, 25 pages, U.S. Appl. No. 101599,523, filed Sep. 29, 2006.
Final Office Action dated Jan. 5, 2010, 20 pages, U.S. Appl. No. 10/599,523, filed Sep. 29, 2006.
Advisory Action dated Mar. 22, 2010, 5 pages, U.S. Appl. No. 10/599,523, filed Sep. 29, 2006.
Office Action dated Apr. 27, 2010, 16 pages, U.S. Appl. No. 10/599,523, filed Sep. 29, 2006.
Final Office Action dated Dec. 16, 2010, 18 pages, U.S. Appl. No. 10/599,523, filed Sep. 29, 2006.

US 8,303,743 B2

THERMOPLASTIC COMPOUND PLATE-SHAPED MATERIAL, METHOD FOR MANUFACTURING AND ARTICLES MANUFACTURED USING THE SAME

CROSS-REFERENCE TO RELATED APPLICATIONS

This application is a divisional application of U.S. patent application Ser. No. 10/599,523 filed Sep. 29, 2006, entitled "Thermoplastic Compound Plate-Shaped Material, Method for Manufacturing and Articles Manufactured Using the Same" which is a 35 U.S.C. 371 of International Application No. PCT/KR2005/001250 filed Apr. 29, 2005, entitled "Thermoplastic Compound Plate-Shaped Material, Method for Manufacturing and Articles Manufactured Using the Same," which claims priority from Korean Patent Application No. 10-2004-0030641 filed Apr. 30, 2004, all of which are by Sang Jun Youn et al., and are incorporated herein by reference as if reproduced in their entirety.

TECHNICAL FIELD

The present invention relates to a thermoplastic composite sheet, a manufacturing method thereof and an article manufactured therefrom. Particularly, the thermoplastic composite sheet can substitute for wood and steel panels.

BACKGROUND ART

Japanese patent laid-open publication No. Hei 4-19935 discloses a process of forming decorative wood laminates, such as sheets, by impregnating fine wood and cellulose powder with urea resin, drying and neutralizing the impregnated material, and entraining the neutralized material into a thermoplastic resin. Also, the publication discloses a method of forming a decorative wood board with the desired shape by additionally processing the decorative laminate, sticking the processed decorative laminate to a pallet having a cut network section along the thickness direction thereof, and pressing the resulting structure. However, the panel product has problems in that it can be used in a given specification due to a hollow in the center thereof, and if a portion thereof is cut and used, it will show deterioration in physical properties and a reduction in bending elastic modulus as a function of density, so that it will be unsuitable for use as a support for concentrated load. Another problem is that its production process is complicated.

Korean patent laid-open publication No. 96-443 discloses a form panel made of recycled resin, which is prepared by extruding recycled gel-like resin in the form of a plate, rolling the plate to the designed thickness while cold forming the plate into the desired shape. However, this product has problems in that it is heavy in weight, its physical properties are determined depending on the kind and composition of the recycled resin, and its production process is complicated.

Regarding compound panels, Japanese patent laid-open publication No. Hei 4-50900 discloses the technology of foaming the center layer of a multi-layer structure. The invention disclosed in this publication relates to an industrial multi-layer panel excellent in thermal resistance, impact resistance and rigidity, which is made of polyolefin, such as polypropylene or polystyrene. This panel is characterized by a multi-layer sheet of a glass fiber-reinforced resin composite, comprising a sheet layer of thermoplastic resin containing 10-45% by weight of glass short staple fibers, and a base sheet layer of expanded thermoplastic resin containing 5-50% by weight of fine inorganic powder and having a density of 0.4-1.11 g/cm$^3$. However, this panel product has problems in that it is heavy in weight and low in impact strength since its center layer density and overall density are as high as 0.84-0.85 g/cm$^3$ and 1.75-1.76 g/cm$^3$, respectively.

Korean patent laid-open publication No. 2004-0003835 discloses panels capable of substituting for form panels for use in the formation of concrete walls, temporary door frames for wood door frames, stoppers and other plywood panels, as well as a manufacturing method thereof. However, the products disclosed in the publication are unsuitable for recycling products laminated with plywood as the coated products and shows a reduction in production efficiency upon the application of a pressing process. Also, this invention uses plywood, and thus, do not contribute to reduce the consumption of natural resources.

Korean patent laid-open publication No. 10-2002-0092590 discloses a synthetic resin panel manufactured from wastes, such as waste plastic, waste cotton, waste leather, waste wood, sawdust, etc., as main materials, as well as a form panel manufactured therefrom. This invention uses a glass fiber layer in which a continuous reinforcing fiber layer is non-impregnated, and thus, is weak in strength and inter-layer adhesion. In addition, upon its use and cutting, fiber dusts fly in all directions, thus causing damage to the health of workers.

Korean patent laid-open publication No. 96-4300 discloses a multi-layer composite panel which has a hollow in the center and can be used as a concrete form. This panel is a five-layer panel manufactured by laminating a network fiber material on a hollow center layer of a lattice structure and sticking a foaming layer of composite resin on the laminated fiber layer by heating. However, the composite panel disclosed in the publication shows low physical properties since the adhesion between the resin layers is interfered by the network fiber layer. Also, it is difficult to separate the network fiber layer from the hollow center layer, in recycling, and due to the center hollow, the panel is weak against locally concentrated load or impact. Moreover, since the continuous reinforcing fiber layer is a non-impregnated glass fiber layer, it has no an effective reinforcing action and also the adhesion between the layers is weakened. Also, upon its use and cutting, fiber dusts fly in all directions, thus causing damage to the health of workers.

Korean patent laid-open publication No. 10-2001-0016955 discloses a multi-layer panel comprising a surface layer treated with synthetic resin on both or single side thereof, and a center layer made of a mixture of wood flour, chaff powder and waste plastic resin. This panel is lighter in weight than a multi-layer resin panel and satisfies the requirements of both strength maintenance and water tightness. However, it has no reinforcing fiber layer, and thus, is insufficient in bending strength, physical properties, linear thermal expansion coefficient, and impact strength.

In addition, wood panels which are used for industrial applications and as form panels in the constructional field have not only limitation in their supply but also the risk of damage to forests. For this reason, the development of a substitute material for the wood boards now exists. Accordingly, various plastic and synthetic resin-based panels are currently developed. The common disadvantage of the plastic panels is that the bending elastic modulus at temperature of 30-60° C. is low. Also, their liner thermal expansion coefficient is generally as high as $1 \times 10^{-4}$/K, and thus, if there is a great change in surrounding temperature, the panels will encounter problems caused by their expansion or shrinkage. Although these problems can be solved to some extent by increasing the content of a filler and the like, the increase in the filler content results in a reduction in impact resistance and an increase in density leading to an increase in weight, thus making the use of the panels inconvenient. These problems are caused by the intrinsic properties of commercially available thermoplastic polymers, and thus, unavoidable in products manufactured from such materials. On the other hand, wood panels have a very low thermal expansion coefficient of $1\times10^5$/K at a temperature of 0-50° C., and a high bending elastic modulus of 25,000-50,000 kg/cm². Also, they show an insignificant reduction in physical properties at high temperature and have a lightweight corresponding to a density of 0.6-0.8 g/cm³. However, the existing products fail to satisfy all such requirements, and thus, cannot fully substitute for the functions of wood panels.

In attempts to solve these problems, any of the following methods as done in the prior art is used: (1) a glass fiber-reinforced resin composite layer is used; (2) a network sheet of glass fibers is laminated; (3) a composite resin layer containing a significant amount of wood flour is used; or (4) a wood board is coated with a certain material. However, the method (1) provides a product reinforced with short staple fibers, and thus, results in limitations in improving bending strength and linear thermal expansion coefficient. This limitation may also be overcome by increasing the amount of reinforcing fibers or the aspect ratio of fibers, but in which case manufacturing cost will be increased. The method (2) including the use of the network layer of glass fibers hardly exhibits sufficient effects since the impregnability of thermoplastic resin into glass fibers is very poor. The method (3) including the use of a large amount of wood flour and inorganic filler results in a great reduction in material cost, but shows no great effect on the improvement of physical properties. Thus, this method is generally used in combination with the method (1). The method (4) cannot basically solve environmental burdens caused by the use of wood boards, i.e., environmental destruction caused by felling. Also, the method has the problem of interlayer separation since the adhesion compatibility between the wood board and the resin layer is low.

Multi-layer panel products including thermoplastic polymer resin as a base resin mostly have a linear thermal expansion coefficient of more than $8\times10^{-5}$/K. For this reason, there is a felt need for the development of technology allowing shrinkage and expansion to be remarkably low even in the case of a severe change in temperature, such as the daily range of temperature, while making impact and bending strength excellent.

For automobile parts, various composite resin materials are now being developed to solve the problems of cost and weight in the existing metal and steel materials. Particularly, a compound material for a bumper back beam is manufactured by the technology comprising laminating a glass fiber mat, chopped fibers and thermoplastic polyolefin resin (e.g., polypropylene) and melt-compressing the laminate to prepare a glass mat thermoplastic (GMT) sheet, heating and compression-molding the GMT sheet into the desired shape. Although this technology provides relatively high specific strength and impact strength, the method of making the GMT sheet is a heat-compression method providing only incomplete impregnation of the resin into the fibers. Thus, this technology has problems in that not only a non-impregnated portion of the fibers does not effectively contribute to enhance the physical properties of the product, but also an environmental problem, such as dropping of fibers onto workers in drilling and bolting operations, is caused.

Also, since a simple structure, sufficient melting time and compression time are required, in order to achieve sufficient impregnation in the compression-molding process, this technology has the problem of an increase in molding time and cannot form ribs with various structures.

In addition to the GMT technology, there is suggested a method of manufacturing completely impregnated long fiber thermoplastic composite products by a pultrusion process. However, the products manufactured by this method have a problem in that they are insufficient in strength or cause defects at welded lines, due to insufficient fiber length.

DISCLOSURE OF THE INVENTION

Therefore, the present invention has been made to solve the above-mentioned problems occurring in the prior art, and it is an object of the present invention to provide composite sheet which is excellent in not only mechanical properties, such as bending strength, bending elastic modulus, impact strength and linear thermal expansion coefficient, but also secondary processability, and is suitable for molding into various structures, such as panels for use as building materials, and automobile parts, as well as a manufacturing method thereof and an article manufactured therefrom.

To achieve the above object, in one aspect, the present invention provides a composite sheet comprising: a center layer of thermoplastic resin; and a continuous reinforcing fiber-impregnated prepreg layer laminated on at least one surface of the upper and lower surfaces of the center layer; the prepreg layer comprising 5-65% by weight of reinforcing fibers and 35-95% by weight of thermoplastic resin.

In another aspect, the present invention provides a method for manufacturing a composite sheet, the method comprising the steps of: (i) melt-extruding thermoplastic resin into a given shape to prepare a center layer; and (ii) providing a continuous reinforcing fiber-impregnated prepreg layer and compressing the prepreg layer on at least one surface of the center layer, the prepreg layer comprising 5-65% by weight of reinforcing fibers and 35-95% by weight of thermoplastic resin.

In still another aspect, the present invention provides an article manufactured by molding the composite sheet manufactured as the above described into a given shape in a molding machine together with pellets comprising 10-60% by weight of strength-reinforcing material and 40-90% by weight of thermoplastic resin.

Alternatively, the above-described article, such as a building material or an automobile part, may be manufactured by molding a continuous reinforcing fiber-reinforced prepreg alone or in combination with a GMT sheet into the desired shape in a molding machine together with thermoplastic resin.

Also, the composite sheet may be formed into the desired shape by press-molding it alone or in combination with a GMT sheet after heating.

BEST MODE FOR CARRYING OUT THE INVENTION

Hereinafter, preferred embodiments of the present inventions will be described in detail with reference to the accompanying drawings.

Figure 1:
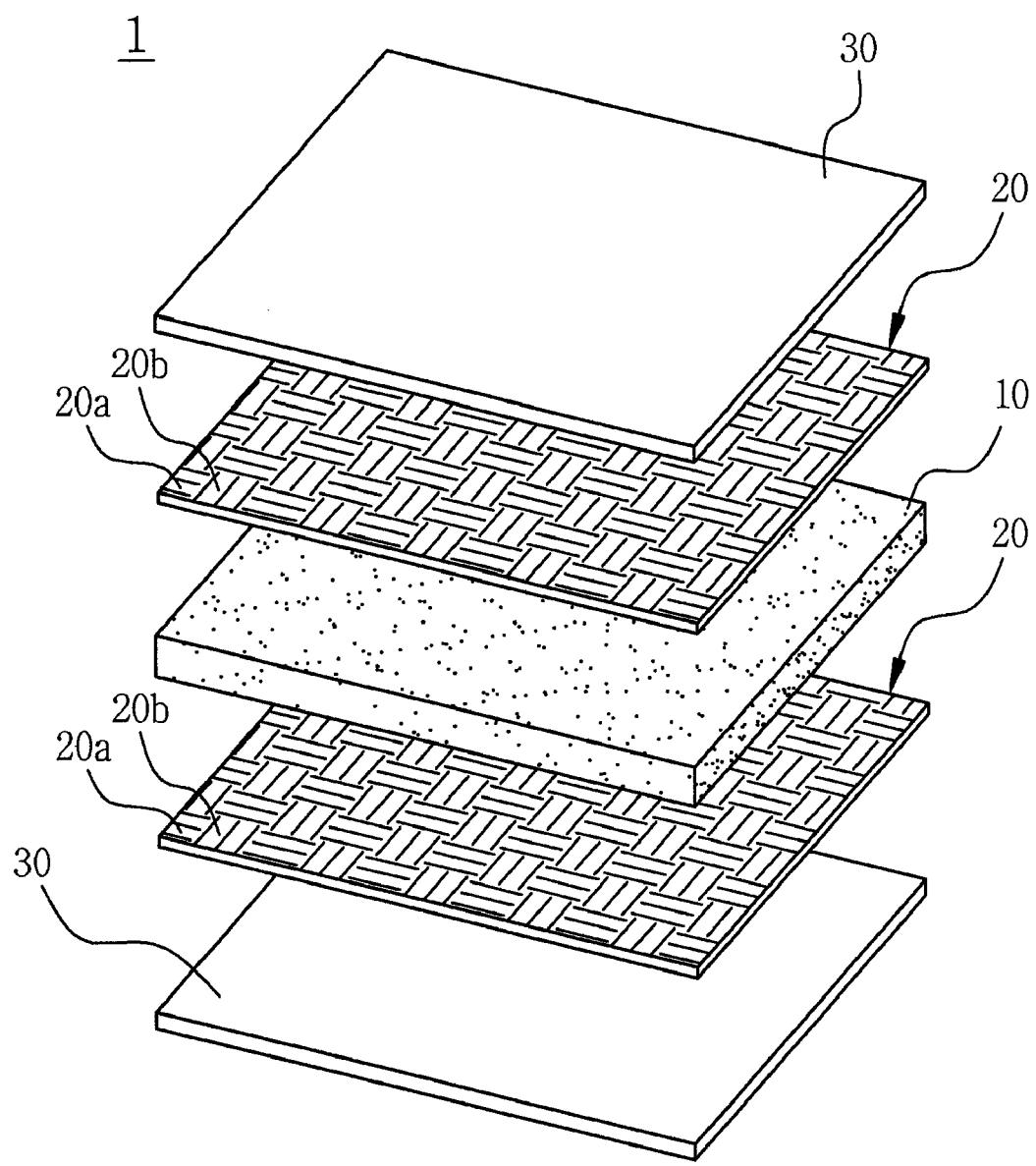
FIG. 1 is a perspective view showing a state where layers forming a thermoplastic composite sheet according to the present invention are separated from each other.
Figure 2:
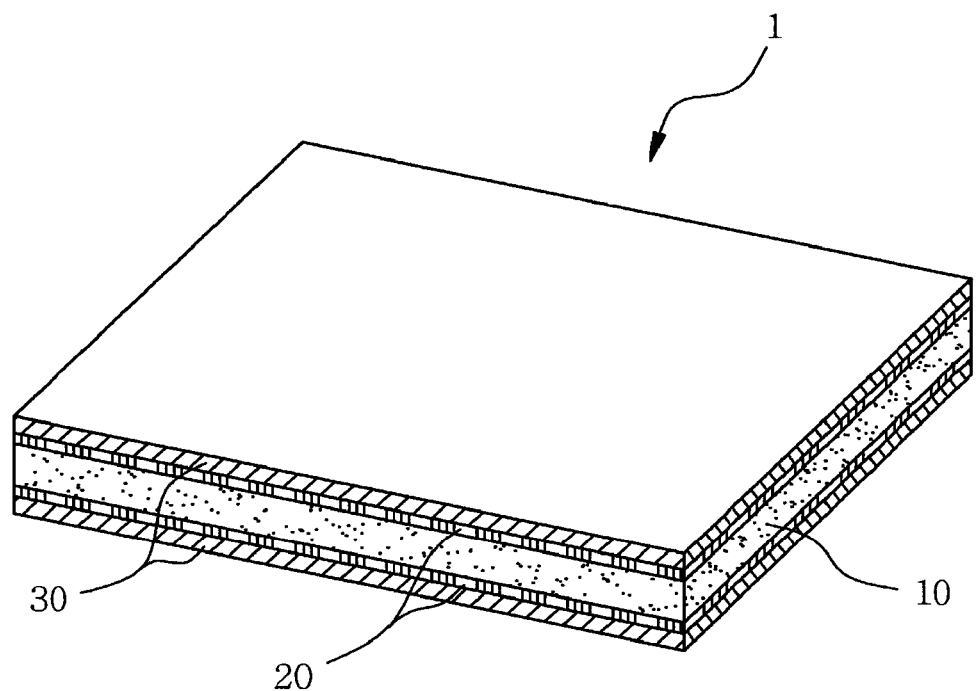
FIG. 2 is a perspective view showing a state where the layers forming the thermoplastic composite sheet shown in FIG. 1 are coupled to each other.
Figure 3:
FIG. 3 schematically shows a side cross-sectional view of a tape-shaped prepreg forming the prepreg layer of the thermoplastic composite sheet shown in FIG. 1.

FIG. 1 is a perspective view showing a state where layers forming a thermoplastic composite sheet according to the present invention are separated from each other, and FIG. 2 is a perspective view showing a state where the layers of the thermoplastic composite sheet shown in FIG. 1 are coupled to each other.

As can be seen in the drawings, the thermoplastic composite sheet 1 according to a preferred embodiment of the present invention comprises the melt-extruded center layer 10, the continuous reinforcing fiber-impregnated prepreg layer 20 laminated on the upper and/or lower surface of the center layer 10, and optionally, the protective layer 30 laminated on the continuous reinforcing fiber-impregnated prepreg layer 20.

The center layer 10 may preferably be made from a foaming layer and a fiber-reinforced thermoplastic resin. If necessary, the center layer 10 made of fiber-reinforced thermoplastic resin may also comprise 5-50% by weight of reinforcing fibers with an average length of 1-30 mm, 15-30% by weight of inorganic filler, or 20-40% by weight of wood flour or chaff.

As shown in FIG. 1, the continuous reinforcing fiber-impregnated prepreg layer 20 has a flat structure woven in the form of the weft 20a and the warp 20b or formed into a bi-directional or uni-directional configuration where tapes or strands are laminated on each other. Each of the tapes or strands forming the continuous reinforcing fiber-impregnated prepreg layer 20 comprise 5-65% by weight of reinforcing fibers with an average length of 5-30 mm and 35-95% by weight of thermoplastic resin. The thermoplastic resin may also contain 0.2-5% by weight of inorganic fillers, such as calcium carbonate, hallow beads, talc, mica, wollastonite, zinc sulfide and activated carbon.

The reinforcing fibers contained in a uniform mixture of thermoplastic resin and reinforcing fibers (i.e., continuous reinforcing fiber-impregnated prepreg layer 20), are uniformly impregnated with thermoplastic resin while forming continuous fiber bundles in a length direction. Thus, these fibers can be two-dimensionally aligned in the form of, for example, wefts and warps, as desired, and can be aligned to an unlimited extent in the transverse and longitudinal directions of the panel.

The continuous reinforcing fiber-reinforced prepreg layer 20 used in the present invention is formed in a tape or strand shape by drawing and pressing fibers passed through an impregnation die supplied with a thermoplastic resin melt. The tape or strand so obtained has a thickness of about 0.4-0.5 mm and a width of about 5-12 mm, and consists of about 5,000 fiber filaments. The impregnated prepreg forming the continuous reinforcing fiber-impregnated prepreg layer 20 was shown to have about 5-10 times higher tensile straight than a general glass fiber composite material. The mechanical properties of the formed prepreg tape or strand were measured according to ASTM D3039, and the results are shown in Table 1 below. In this regard, the cross-head speed was 2 mm/min, and the gauge length was 150 mm.

TABLE 1

| | No. | Width (mm) | Depth (mm) | Peak load (N) | Elongation at peak | Tensile strength (Kgf/cm$^2$) | Ultimate tensile strength (Mpa) | Tensile modulus (Gpa) |
|---|---|---|---|---|---|---|---|---|
| Group I | 1 | 8.1 | 1.0 | 3058 | 4.0 | 3850 | >378 | 16.3 |
| | 2 | 8.5 | 0.96 | 3100 | 4.0 | 3875 | >380 | 16.1 |
| | 3 | 7.4 | 1.1 | 2860 | 3.7 | 3540 | >352 | 16.3 |
| Group II | 1 | 7.3 | 0.55 | 1651 | 4.6 | 4190 | >411 | 15.0 |
| | 2 | 7.3 | 0.54 | 1728 | 5.2 | 4500 | >441 | 15.8 |
| | 3 | 7.4 | 0.56 | 1628 | 5.1 | 4220 | >413 | 15.3 |

The protective layer 30 is optionally melted and adhered to the continuous reinforcing fiber-impregnated prepreg layer 20 by melt extrusion, in order to prevent the continuous reinforcing fiber-impregnated prepreg layer. The protective layer 30 is a thermoplastic resin layer, a foamed thermoplastic resin layer or a fiber-reinforced thermoplastic resin layer and comprises 0-54% by weight of reinforcing fibers and 46-100% by weight of thermoplastic resin. In this regard, the thermoplastic resin may also contain 0.2-5% by weight of inorganic fillers, such as such as calcium carbonate, hallow beads, talc, mica, wollastonite, zinc sulfide and activated carbon.

The reinforcing fibers used in the center layer 10, the continuous reinforcing fiber-reinforced prepreg layer 20 and the protective layer 30 may be selected from the group consisting of glass fibers, aramid fibers, natural fibers, polyester fibers, polyamide fibers, and a mixture thereof. The thermoplastic resin may be selected from the group consisting of polypropylene, polyethylene, polyamide, polyester and polyphenylene sulfide resins, and a mixture thereof.

The thermoplastic composite sheet according to an embodiment of the present invention is manufactured in the following manner.

Figure 5:
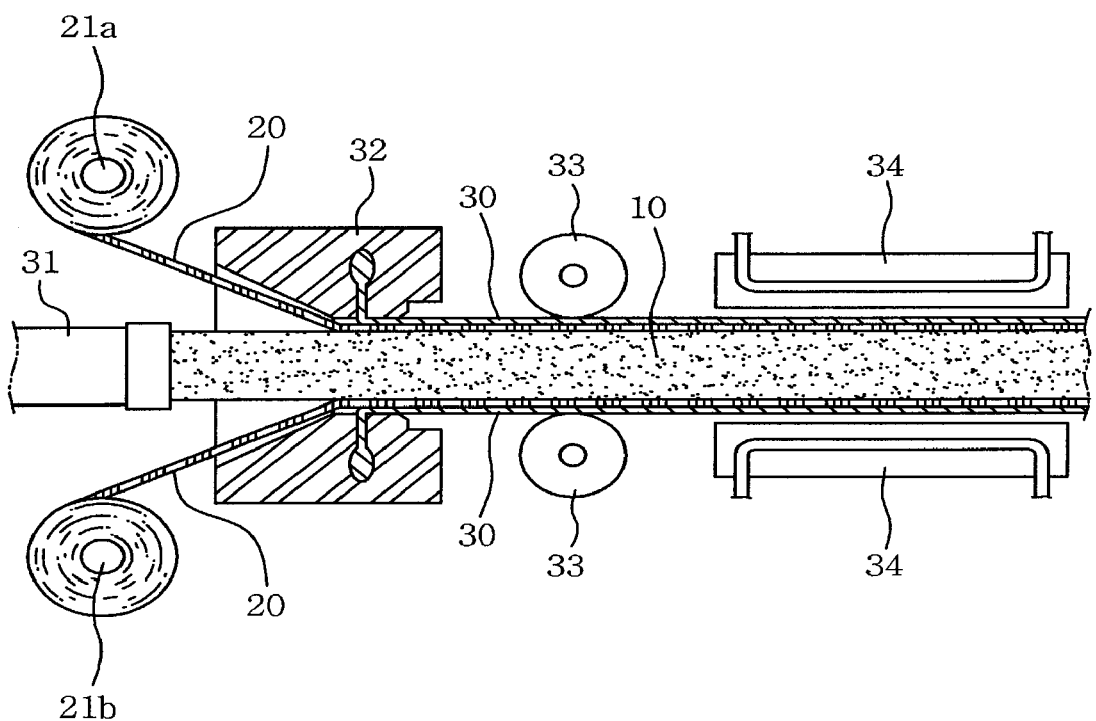
FIG. 5 is a side cross-sectional view schematically showing a process for manufacturing a thermoplastic composite sheet according to the present invention.
Figure 6:
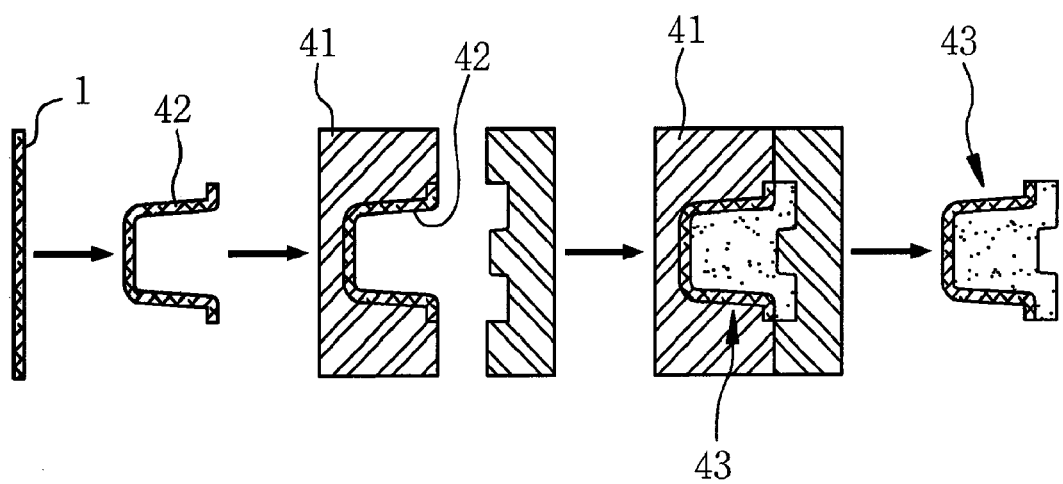
FIGS. 6 and 7 schematically show processes of using the inventive thermoplastic composite sheet to form a building material and an automobile part, respectively.

As shown in FIG. 5, a uniform mixture of thermoplastic resin and glass fibers, which has been subjected to an impregnation process, is molded in the form of a tape or a strand. Then, the tapes or strands are woven or laminated to prepare the continuous reinforcing fiber-impregnated prepreg 20 with a thickness of 0.4-0.9 mm, which has the weft 20a and the warp 20b, and then the impregnated prepreg 20 is wound around the rollers 21a and 21b. The impregnated prepregs 20 wound around the rollers 21a and 21b are disposed on the upper surface and/or lower surface of the center layer 10 extruded from a center layer extruder 31, respectively.

As described above, the center layer 10 may contain wood flour or chaff or may be made of a foam material. If the center layer 10 contains wood flour or chaff, 20-40% by weight of waste wood flour or chaff with a particle size of less than 25 meshes and a water content of less than 4% will be mixed with 60-80% by weight of polypropylene, and then extruded through the extruder 31 in a state where the mixture has been heated to a temperature of 160-200° C. Also, if the center layer 10 is made by foaming, 0.2-5% by weight of an inorganic or organic foaming agent, and preferably, a 1:1 mixture of $NaHCO_3$ with citric acid, or azo dicarboxamide, will be uniformly mixed with propylene resin, and the mixture will be heated to a temperature of 160-200° C. and formed into the desired shape through the extruder 31. Also, the center layer 10 may be obtained by extruding a long fiber-reinforced composite material or a composite material through the extruder 31, in the same manner as described above. Also, the center layer 10 may be obtained by mixing recycled polyethylene powder resin with 1-4% by weight of a pigment with the desired color and extruding the mixture at a temperature of 150-190° C., in the extruder 31.

The continuous reinforcing fiber-impregnated prepreg 20 is passed through the protective layer die 32 together with the center layer 10 in the moving direction of the center layer 10 extruded from the extruder 31, during which it is continuously formed on the upper surface and/or lower surface of the center layer 10. The center layer 10 and continuous reinforcing fiber-impregnated prepreg layer 20 passed through the protective layer die 32 are planarized by the upper and lower compression rolls 33 disposed adjacent to the outlet of the die 32, and then, cooled while they are passed through the cooling unit 34. Unlike the prior method including a discontinuous process, such as pressing or stamping, the inventive process can simply control the post-cooling deformation of the thermoplastic composite sheet and can show a great increase in production efficiency.

The protective layer 30 which is melted and adhered on the continuous reinforcing fiber-reinforced prepreg layer 20 to a thickness of 0.5-3 mm is extruded from the protective layer die 32 to the continuous reinforcing fiber-reinforced prepreg layer 20 laminated on both surfaces of the center layer 10, and compressed to a given thickness, for example, 1-3 mm, by the compression rolls 33, so that the inventive thermoplastic composite sheet can be made in a multi-layer structure. The protective layer 30 is melted and adhered on the continuous reinforcing fiber-reinforced prepreg layer 20, and compressed on the prepreg layer 20 by the compression rolls 33 and then cooled by the cooling unit 34, thus preparing a molded flat material with a multi-layer structure. The cooled molded material can be withdrawn by withdrawing rolls (not shown) and cut into a given size by means of a cutter.

Meanwhile, the thermoplastic composite sheet according to the present invention may also be produced in the form of either a constructional board with a smooth surface or a board having various patterns formed thereon, depending on the surface patterns of the compression rolls 33 after the protective layer 30 has been melted and adhered on the continuous reinforcing fiber-impregnated prepreg layer 20 but before the cooling process.

EXAMPLE 1

According to the inventive method as described above, a fiber-reinforced continuous prepreg tape having a thickness of 0.25 mm and a width of 25 mm is obtained by impregnating 40% by weight of glass fiber with thermoplastic polypropylene resin, a 4 mm-thick prepreg sheet was manufactured by weaving or laminating the fiber-reinforced continuous prepreg tape in order to use in manufacturing of a thermoplastic composite sheet. The sheet was measured for bending strength, sheet impact strength and Izod impact resistance, and the results are shown in Table 2 below.

Comparative Example 1

A 4 mm-thick composite sheet was manufactured from a mixture of polypropylene-based resin and 40% by weight of glass fibers by the prior GMT process and measured for bending strength, sheet impact strength and Izod impact strength, and the results are shown in Table 2 below.

TABLE 2

| | Sheet impact crack initiation energy (J) | Sheet impact energy (J) | Bending elastic modulus (kgf/cm$^2$) | Bending strength (kgf/cm$^2$) | Izod impact resistance (kgf · cm/cm) | Content of glass fibers (wt %) | Density (g/cc) |
|---|---|---|---|---|---|---|---|
| Example 1 | 28 ± 3 | 42 ± 3 | 110,000 ± 10,000 | 2,700 ± 400 | 135 ± 30 | 40 | 1.2 |
| Comparative Example 1 | 10 ± 3 | 24 ± 4 | 52,318 ± 9,250 | 1,437 ± 424 | 70 ± 20 | 42 | 1.22 |
| | Dynatub (speed: 10.3 m/sec, and impact energy: 167 J) | | ASTM D790 | ASTM D790 | | | |

As can be seen in Table 2, all the mechanical properties of the prepreg sheet woven or laminated with the thermoplastic prepreg tape according to the present invention were two times higher than those of a non-impregnated sheet. In the case of GMT, if the time of heat-compression was made very long, a slight improvement over the above-described physical properties could be achieved but the process time would be at least two times longer than Example 1.

EXAMPLE 2

According to the inventive method as described above, a prepreg layer woven or laminated with a continuous fiber prepreg tape having a thickness of 0.25 mm and a width of 25 mm, obtained by impregnating 40% by weight of glass fibers with thermoplastic polypropylene resin, was laminated in two layers on each of both sides of 1 mm-thick center layers made of a long fiber-resin composite, thus manufacturing a laminated sheet with a total thickness of 3 mm. The sheet was measured for bending strength, sheet impact strength and Izod impact strength, and the results are shown in Table 3 below.

Comparative Example 2-1

According to the prior GMT process, a 4 mm-thick composite sheet made of polypropylene-based resin and 40% by weight of glass fibers was melt-pressed to a thickness of 3 mm at 230° C. such that the largest possible amount of polypropylene could be penetrated between the glass fibers. The melt-pressed sheet was measured for bending strength, sheet impact strength and Izod impact strength, and the results are shown in Table 3 below.

Comparative Example 2-2

A 3 mm-thick injected sample consisting of only a discontinuous long fiber-resin composite sheet obtained by impregnating 40% by weight of glass fibers with thermoplastic polypropylene resin was manufactured and measured for bending strength, sheet impact strength and Izod impact strength. The results are shown in Table 3.

As can be seen in Table 3, in case the long fiber-resin composite was used at the center layer, also Example 2 has excellent mechanical properties in comparison with the prior GMT and the discontinuous long fiber-resin composite sheet of Comparative Example 2-2.

of 0.25 mm and a width of 25 mm, which has been obtained by impregnating thermoplastic polypropylene resin into glass fibers. The prepreg layer 20 was laminated in one layer on each of both sides of the 10 mm-thick center layer 10 consisting of a composite layer of 40% by weight of chaff and polypropylene resin. Between the center layer 10 and the continuous reinforcing fiber-impregnated prepreg layer 20, a 0.5 mm-thick polypropylene adhesive layer was provided and the layers were melt-adhered to each other, thus manufacturing a laminated sheet with a thickness of 12 mm. The sheet was measured for bending strength, sheet impact strength and Izod impact strength, and the results are shown in Table 4 below.

Comparative Example 3-1

A 2 mm-thick layer made of only thermoplastic polypropylene resin (MI 0.5 g/dmin, a block copolymer) was formed on both sides of the 10 mm-thick center layer made of a composite of 40 wt % of chaff and polypropylene resin, thus manufacturing a 12 mm-thick laminated sheet. The sheet was measured for bending strength, sheet impact strength and Izod impact strength, and the results are shown in Table 4 below.

Comparative Example 3-2

A 2 mm-thick layer made of a composite obtained by impregnating polypropylene into 20% by weight of glass fibers was formed on both sides of the 8 mm-thick center layer made of a composite of 40 wt % of chaff and polypropylene resin, thus manufacturing a 12 mm-thick laminated sheet. The sheet was measured for bending strength, sheet impact strength and Izod impact strength, and the results are shown in Table 4.

Comparative Example 3-3

A 1 mm-thick layer made of only thermoplastic polypropylene resin (MI 0.5 g/dmin, block copolymer) was formed

TABLE 3

| | Sheet impact crack initiation energy (J) | Sheet impact energy (J) | Bending elastic modulus (kgf/cm$^2$) | Bending strength (kgf/cm$^2$) | Izod impact strength (kgf · cm/cm) | Content of glass fibers (wt %) | Density (g/cc) |
|---|---|---|---|---|---|---|---|
| Example 1 | 28 | 39 | 87,000 | 2,183 | 100 | 40 | 1.2 |
| Comparative Example 2-1 | 15 | 31 | 68,000 | 2,070 | 84 | 42 | 1.22 |
| Comparative Example 2-2 | 4.7 | 13 | 65,000 | 1,347 | 40 | 40 | 1.2 |
| | Dynatub (speed: 10.3 m/sec, and impact energy: 167 J) | | ASTM D790 | ASTM D790 | | | |

EXAMPLE 3

According to the inventive method as described above, the continuous reinforcing fiber-impregnated prepreg layer 20 with a thickness of 0.5 mm was woven or laminated with a reinforcing fiber-impregnated prepreg tape with a thickness on both sides of the 9.5 mm-thick center layer made of a composite of 40 wt % of chaff and polypropylene resin. Between the center layer and both outer layers, a network woven sheet woven with glass fibers was inserted and the layers were compressed through compression rolls at 200° C., thus manufacturing a 12 mm-thick laminated sheet. The sheet was measured for bending strength, sheet impact strength and Izod impact strength, and the results are shown in Table 4.

TABLE 4

| | Linear thermal expansion coefficient (/K) | Bending elastic modulus (kgf/cm$^2$) | Bending strength (kgf/cm$^2$) | Unnotched Izod impact strength (kgf · cm/cm) | Content of glass fibers (wt %) |
|---|---|---|---|---|---|
| Example 3 | $1.2 \times 10^{-5}$ | 34,000 | 750 | 60 | 3.3 |
| Comparative Example 3-1 | $4.5 \times 10^{-5}$ | 20,500 | 400 | 13 | 0 |
| Comparative Example 3-2 | $3.5 \times 10^{-5}$ | 32,000 | 540 | 40 | 6.7 |
| Comparative Example 3-3 | $4.8 \times 10^{-5}$ | 26,000 | 450 | 18 | 3.3 |

As can be seen in Table 4, Example 3 including the continuous reinforcing fiber-impregnated prepreg layer was excellent in physical properties even at the same glass fiber content as compared to Comparative Example 3-3 including the non-impregnated fiber layer. Also, Example 3 showed significantly excellent physical properties as compared to Comparative Example 3-1 having no glass fiber-reinforced layer and Comparative Example 3-2 formed by the extrusion of cut fibers. In the case of Comparative Example 3-2, the overall glass fiber content was 6.7 wt % reaching two times that of Comparative Example 3, but showed a reduction in physical properties. This is thought to be because discontinuous short fibers were used and the thickness distribution of the outer layers in the extrusion was not uniform. Extended fibrous fluid has a phenomenon where it is ununiformly mixed into other layers in a multilayer formation process, and this phenomenon becomes severe with an increase in the fiber length and a reduction in the fiber viscosity.

EXAMPLE 4

On each of both sides of the center layer 10 consisting of a 9 mm-thick polypropylene resin layer expanded to a density of 0.4 g, a polypropylene layer with a thickness of 1 mm was formed. Then, on both sides of the center layer, a 0.5 mm-thick sheet woven with a 0.25 mm-thick and 25 mm-wide, continuous reinforcing fiber-impregnated prepreg tape formed by impregnating thermoplastic polypropylene resin into 40 wt % of glass fibers as described above was melt-laminated in one layer, thus manufacturing a laminated sheet with an overall thickness of 12 mm. The sheet was measured for bending strength, bending elastic modulus and Izod impact strength, and the results are shown in Table 5 below.

Comparative Example 4

On both sides of the center layer 10 consisting of a 8 mm-thick polypropylene resin layer expanded to a density of 0.4 g/cc, a 2 mm-thick layer consisting of only a glass fiber-resin composite layer formed by impregnating thermoplastic polypropylene resin into 30 wt % of glass fibers was melt-laminated, thus manufacturing a laminated sheet with an overall thickness of 12 mm. The sheet was measured for bending strength, bending elastic modulus and Izod impact strength, and the results are shown in Table 5.

TABLE 5

| | Linear thermal expansion coefficient (/K) | Bending elastic modulus (kgf/cm$^2$) | Unnotched Izod impact strength (kgf/cm$^2$) | Content of glass fibers (wt %) | Density (g/cc) |
|---|---|---|---|---|---|
| Example 4 | $1.2 \times 10^{-5}$ | 28,000 | 40 | 3.3 | 0.63 |
| Comparative Example 4 | $4.8 \times 10^{-5}$ | 29,000 | 25 | 10 | 0.71 |

As can be seen in Table 5, even though Example 4 had a lower glass fiber content than that of Comparative Example 4, it showed improvements in impact strength, linear thermal expansion coefficient and the like, and similar bending elastic modulus, as compared to Comparative Example 4. Also, Example 4 was lighter in weight, as the use amount of glass fibers was reduced, leading to a reduction in density.

The inventive thermoplastic composite sheet 1 as described above can be used to manufacture building forms or automobile parts, such as automobile bumper back beams.

If the inventive thermoplastic composite sheet 1 is formed into a panel for use as a building material, the thermoplastic composite sheet 1 is then placed in the molding machine 41 as shown in FIG. 5. Then, pellets comprising about 10-60% by weight of reinforcing fibers with a length of less than 30 mm and about 40-90% by weight of thermoplastic resin containing an inorganic filler and a pigment were introduced into the molding machine 41 and molded into the given shape, thus making the molded article 44, such as a lighter-weight and higher-strength panel for use as a building material. Molding methods which can be used to form the inventive thermoplastic composite sheet 1 into a panel for use as a building material, such as a form include high-pressure injection, low-pressure injection, such as compression molding after extrusion or compression molding after injection, and press molding after heating.

Meanwhile, although the inventive thermoplastic composite sheet 1 can be manufactured in a size of 1200 mm×1200 mm, the thermoplastic composite sheet 1 with a larger size can be made by making the panels 1 with a smaller size, overlapping the edges of the panels 1 with each other, and heating and melting the resin contained in the panels 1 so as to connect the panels with each other.

Figure 7:
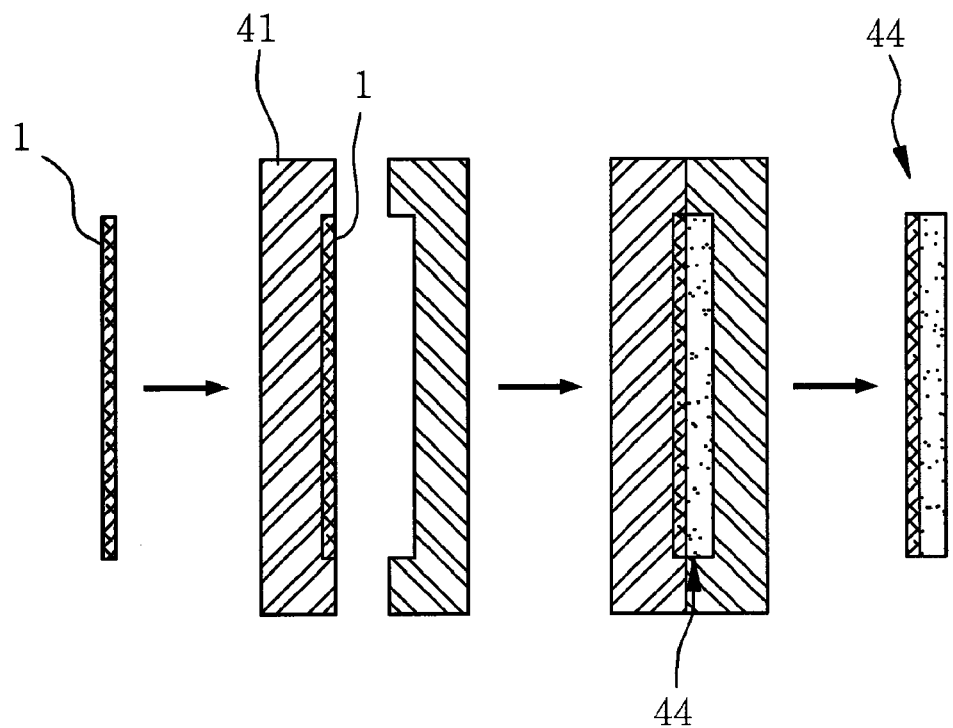

If the thermoplastic composite sheet 1 according to the present invention is used to manufacture an automobile part, such as a bumper back beam, the thermoplastic composite sheet cut into a given size is then preformed into the preform 42 with a given shape as shown in FIG. 7. The preform 42 is placed in the molding machine 41, and formed into a given shape together with pellets comprising about 10-60% by weight of reinforcing fibers with a length of less than 30 mm and about 40-90% by weight of thermoplastic resin containing an inorganic filler and a pigment, as done in the case of making the molded article 44, such as a panel for use as a building material, for example, a form. This gives the molded article 43 with lighter weight and higher strength, such as an automobile part.

Figure 4:
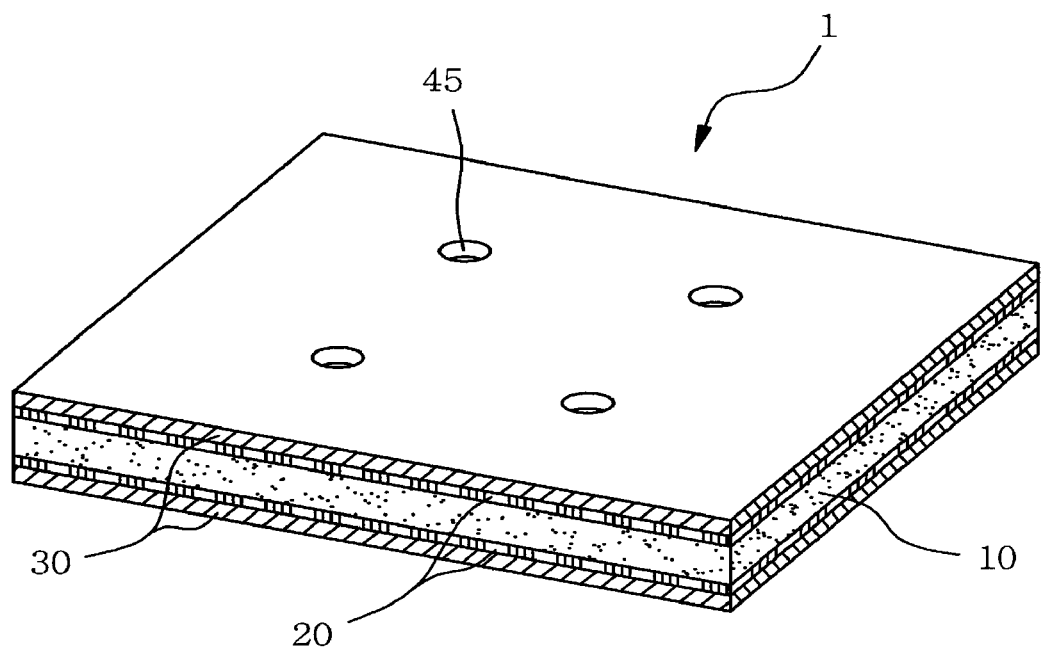
FIG. 4 is a perspective view showing that the thermoplastic composite sheet being formed with holes which are passed therethrough.
Figure 8:
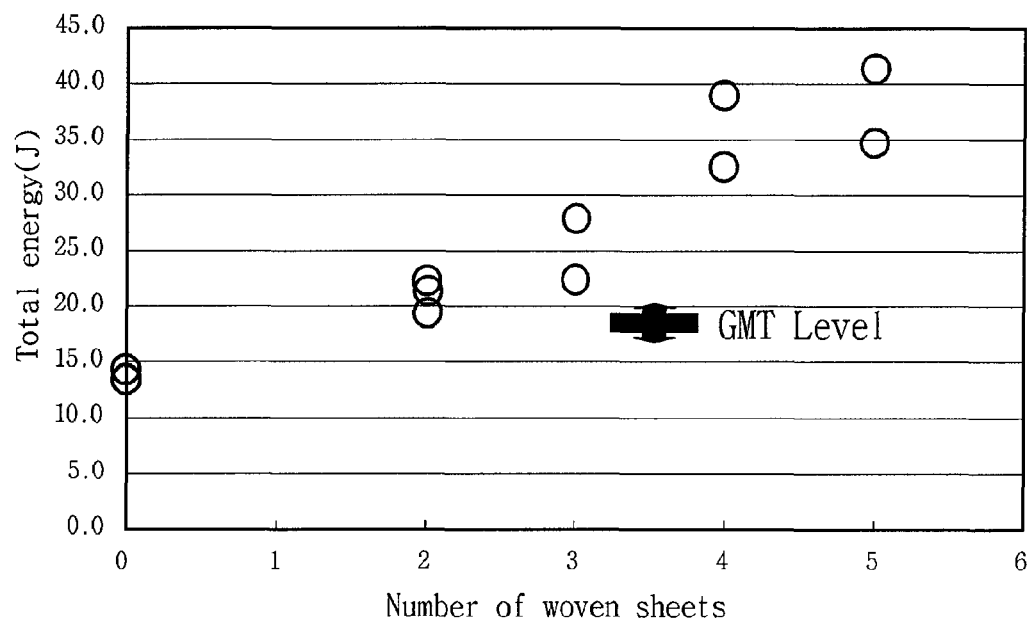
FIG. 8 is a graphic diagram for illustrating an improvement in the physical properties of the thermoplastic composite sheet being formed with holes as shown in FIG. 4.

In order to make a form or an automobile part, the thermoplastic composite sheet 1 according to the present invention may be placed in the molding machine 1 in a state where holes or slits 45 have been formed through the panel 1 as shown in FIG. 4 (only holes are shown in the drawing). As can be seen from a graph shown in FIG. 8, the form or automobile part obtained in this case showed an increase of about 30% in physical properties as compared to the case of using the panel having no holes or slits.

If the thermoplastic composite sheet 1 manufactured by the present invention is used as a preform for industrial structures, such as forms or automobile parts, it will be excellent in impregnability with reinforcing fibers, unlike the prior art. Thus, a structure can be obtained, which has overcome the phenomenon of lack of glass fibers occurring often in the corners of a molded article, such as a form or an automobile part, and has been suitably reinforced with the continuous reinforcing fiber-impregnated prepreg.

The present invention allows the thermoplastic composite sheet to be easily formed by a continuous process as described above and can solve the above-described problems by extruding the long fiber-thermoplastic resin composite material as the center material. The panel thus formed has a compromise between the advantages and disadvantages of the continuous reinforcing fiber-impregnated prepreg and the long fiber-resin composite, and thus, can provide a remarkable reduction in variation in physical properties between varying portions of a secondary processed products by compression-molding.

Figure 9:
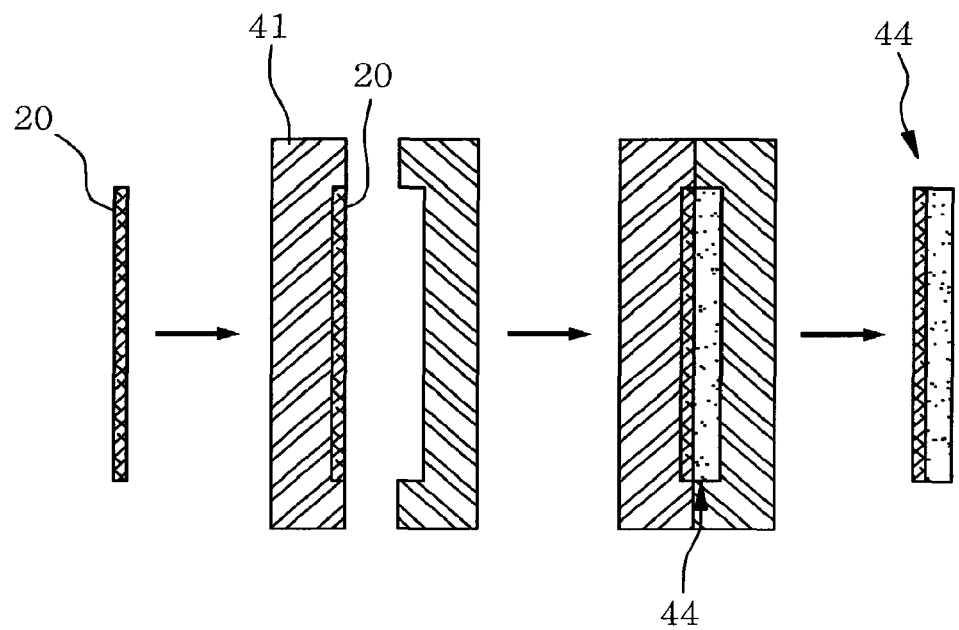
FIGS. 9 and 10 schematically show processes of using a continuous reinforcing fiber-impregnated prepreg included in the inventive thermoplastic composite sheet to form a building material and an automobile part, respectively.
Figure 10:
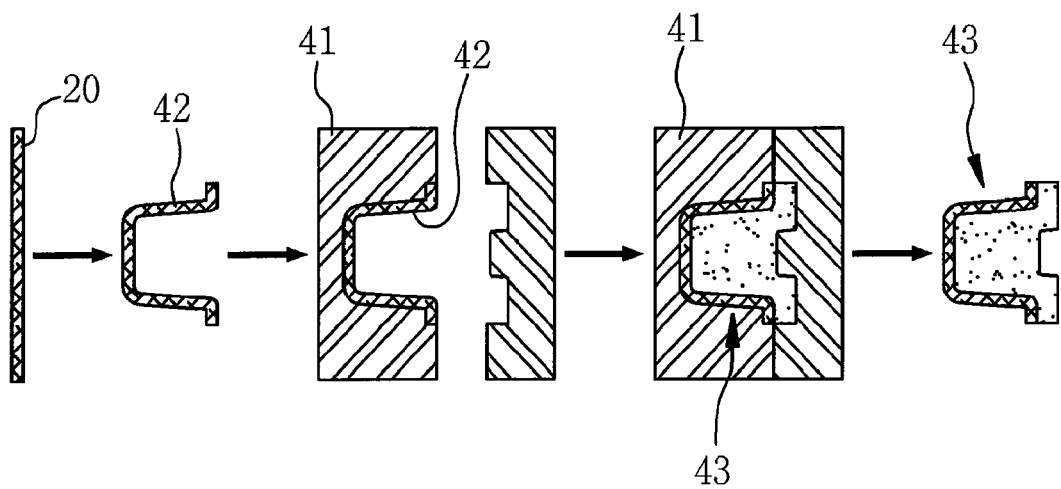

According to the present invention, the building material and automobile part as described above can be manufactured by molding the thermoplastic composite sheet 1 into a given shape in the molding machine 41. Alternatively, as shown in FIG. 9, the building material or the automobile part may also be manufactured by placing the continuous reinforcing fiber-impregnated prepreg layer 20 in the mold 41 and then performing the molding process as described above. In anther alternative embodiment as shown in FIG. 10, the building material or the automobile part may be manufactured by placing in the mold 41 the continuous reinforcing fiber-impregnated prepreg layer 20 preformed into a given shape, and then performing the molding process as described above.

Figure 11:
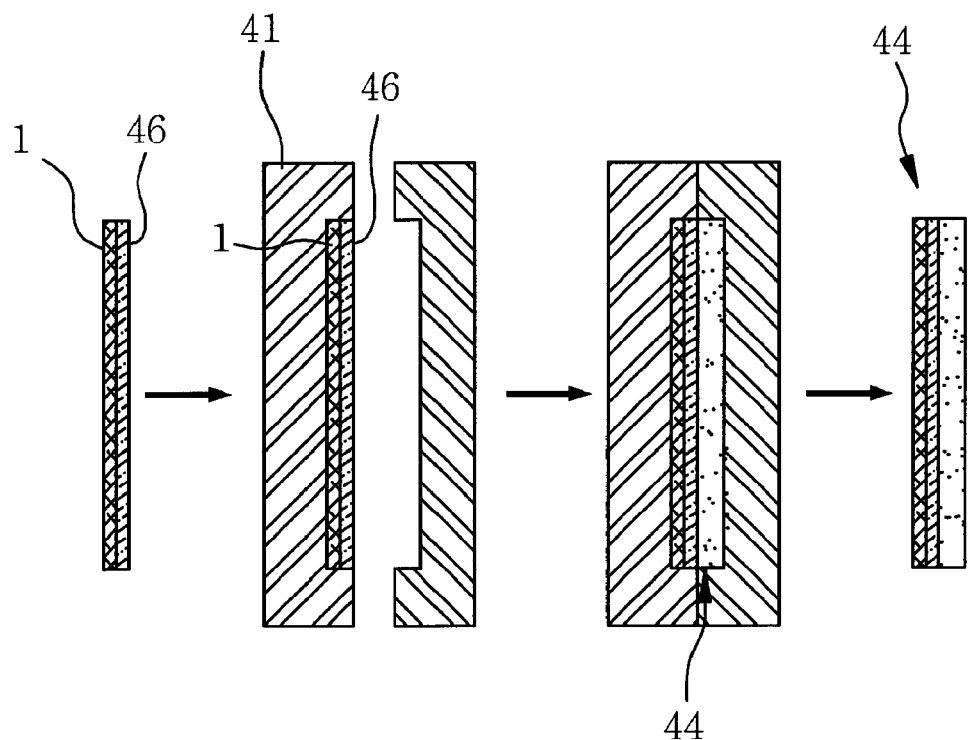
FIGS. 11 and 12 schematically show processes of using the inventive thermoplastic composite sheet in combination with a GMT sheet to form a building material and an automobile part, respectively.
Figure 12:
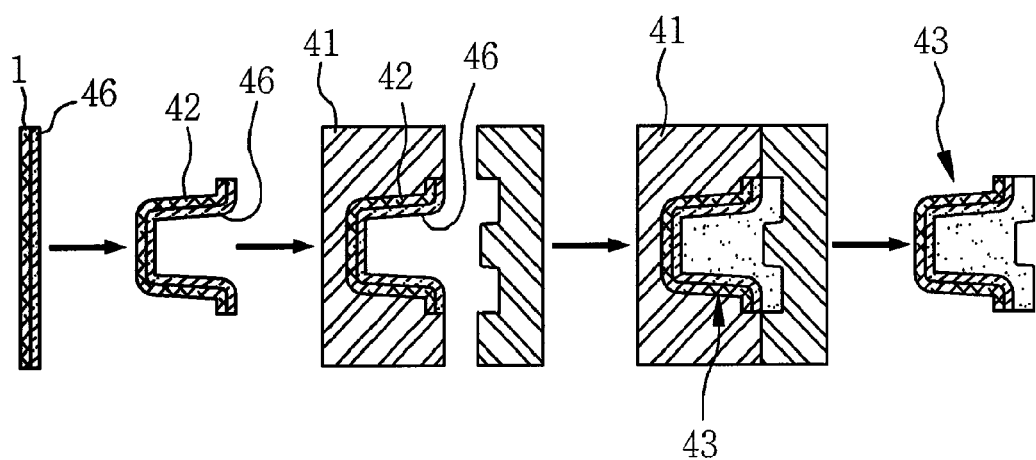
Figure 13:
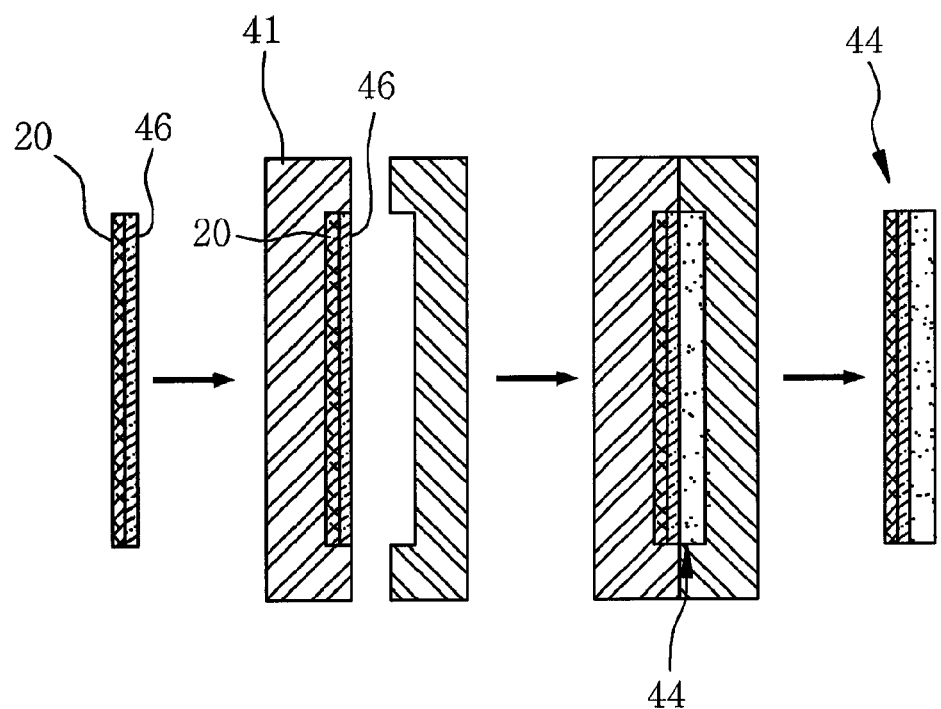
FIGS. 13 and 14 schematically show processes of using a continuous reinforcing fiber-impregnated prepreg included in the inventive thermoplastic composite sheet in combination with a GMT sheet to form a building material and an automobile part, respectively.
Figure 14:
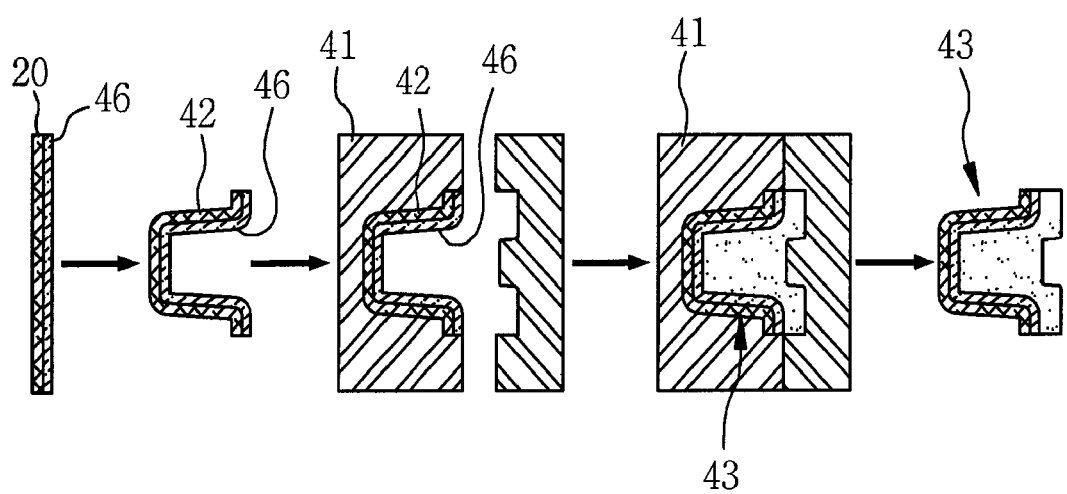

In other alternative embodiments, an article having the same effect as the above-described article, such as a building material or an automobile part, may be manufactured by molding the GMT sheet 46 in combination with the inventive thermoplastic composite sheet 1 as shown in FIGS. 11 and 12, or by molding the GMT sheet 46 in combination with the continuous reinforcing fiber-reinforced prepreg layer 20 as shown in FIGS. 13 and 14.

In still another alternative embodiment, the inventive thermoplastic composite sheet 1 as described above may be simply heated and then pressed-molded into a given shape, thus manufacturing articles, for example, a panel for use as a building material, such as a form, or an automobile part, such as a back beam.

INDUSTRIAL APPLICABILITY

As described above, the present invention provides the technology allowing the industrial thermoplastic composite sheet with high mechanical strength and no scattering of fibers to be produced in high productivity and a cost-effective manner. The inventive thermoplastic composite sheet can be used as an excellent plywood substitute which is low in cost, very high in bending strength and impact strength, and remarkably low in linear thermal expansion coefficient as compared to the prior product, leading to a reduction in thermal deformation caused by the daily range of temperature.

Also, the present invention provides the method allowing the continuous reinforcing fiber-impregnated prepreg to be effectively used. The suitable use of an extrusion process in the present invention allows post-cooling deformation to be simply controlled and production efficiency to be highly increased, unlike the prior method including pressing or stamping, since the continuous reinforcing fiber-impregnated layer is continuously formed and subjected to an in-line cooling process simultaneously to the center layer.

Also, the thermoplastic composite sheet according to the present invention is manufactured by melt-extruding the center layer consisting of a layer formed by melting of completely impregnated long fiber thermoplastic (LFT) pellets, an inorganic filler-resin composite layer, an expanded layer, or a wood flour-resin composite layer, and then sticking a continuous prepreg on the upper surface and/or lower surface of the center layer. Thus, if the inventive thermoplastic composite sheet is used as a preform for forming industrial structures, a structure can be obtained, which is excellent in impregnability with glass fibers, has overcome the phenomenon of lack of glass fibers occurring often in the corners of a molded article, and has been suitably reinforced with the continuous reinforcing fiber-impregnated prepreg.

Furthermore, the present invention provides a reinforced composite resin panel by molding a layer woven or laminated with a continuous reinforcing fiber-impregnated prepreg, into a given shape in combination with a layer formed by melting of completely impregnated long fiber thermoplastic pellets, an inorganic filler-resin composite layer, an expanded layer, or a wood flour-resin composite layer. The inventive thermoplastic composite sheet can be used as an excellent plywood substitute which is low in cost, very high in bending strength (more than 30000 kgf/cm$^2$) and impact strength, and remarkably low in linear thermal expansion coefficient as compared to the prior product, leading to a reduction in thermal deformation caused by the daily range of temperature.

In addition, the inventive thermoplastic composite sheet may also be subjected to a secondary processing process by melt compression, in which case structures with light weight and high mechanical properties can be formed into various shapes, and flat products required therefor can be produced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of manufacturing a thermoplastic composite sheet, comprising the steps of:
    (a) uniformly impregnating fibers with a thermoplastic resin melt,
    (b) drawing and pressing the uniformly impregnated fibers in a tape or strand shape,
    (c) preparing a prepreg layer by aligning the drawn and pressed fibers having the tape or strand shape to form wefts and wraps,
    (d) providing the prepreg layer on at least one surface of a center layer, and
    (e) compressing the layers.

2. The method according to claim 1, wherein the fibers are selected from the group consisting of glass fibers, aramid fibers, natural fibers, polyester fibers, polyamide fibers, and a mixture thereof.

3. The method according to claim 1, wherein the prepreg layer comprises 5-65% by weight of the fibers and 35-95% by weight of the thermoplastic resin.

4. The method of claim 3, wherein the thermoplastic resin is selected from the group consisting of polypropylene, polyethylene, polyamide, polyester, and polyphenylene sulfide resins, and a mixture thereof.

5. The method according to claim 3, wherein the prepreg layer further comprises 0.2-5% by weight of an inorganic filler.

6. The method according to claim 5, wherein the inorganic filler is selected from the group consisting of calcium carbonate, hollow beads, talc, mica, wollastonite, zinc sulfide, activated carbon, and a mixture thereof.

7. The method according to claim 1, wherein the drawn and pressed fibers have a thickness of about 0.4-0.5 mm and a width of about 5-12 mm.

8. The method according to claim 1, wherein the center layer is manufactured by melt-extruding a thermoplastic composite material comprising a thermoplastic resin.

9. The method of claim 8, wherein the thermoplastic resin is selected from the group consisting of polypropylene, polyethylene, polyamide, polyester, and polyphenylene sulfide resins, and a mixture thereof.

10. The method according to claim 1, wherein the center layer further comprises 5-50% by weight of reinforcing fibers with an average length of 1-30 mm.

11. The method of claim 1, wherein the center layer further comprises 15-30% by weight of an inorganic filler.

12. The method according to claim 11, wherein the inorganic filler is selected from the group consisting of calcium carbonate, hollow beads, talc, mica, wollastonite, zinc sulfide, activated carbon, and a mixture thereof.

13. The method of claim 1, wherein the center layer further comprises at least one of 20-40% by weight of wood flour and chaff.

14. The method of claim 1, wherein the center layer of thermoplastic composite material is a foaming layer or a glass fiber-reinforced thermoplastic resin layer.

15. The method of claim 1, wherein step (d) further comprises the step of melt-extruding a mixture of 0-54% by weight of reinforcing fiber and 46-100% by weight of thermoplastic resin onto the prepreg layer to form a protective layer on the prepreg layer.

16. The method of claim 15, wherein the thermoplastic resin is selected from the group consisting of polypropylene, polyethylene, polyamide, polyester, and polyphenylene sulfide resins, and a mixture thereof.

* * * * *